(12) United States Patent
Koppenhagen (10) Patent No.: US 8,930,417 B2
(45) Date of Patent: Jan. 6, 2015

(54) NETWORKED PROCUREMENT

(75) Inventor: Norbert Manfred Koppenhagen, Weinheim (DE)

(73) Assignee: SAP SE, Walldorf (DE)

( * ) Notice: Subject to any disclaimer, the term of this patent is extended or adjusted under 35 U.S.C. 154(b) by 204 days.

(21) Appl. No.: 13/299,080

(22) Filed: Nov. 17, 2011

(65) Prior Publication Data

US 2013/0132445 A1  May 23, 2013

(51) Int. Cl.
*G06F 17/30* (2006.01)
*G06Q 10/06* (2012.01)
*G06Q 50/00* (2012.01)

(52) U.S. Cl.
CPC ............... *G06Q 10/06* (2013.01); *G06Q 50/01* (2013.01)
USPC ..................................... 707/810

(58) Field of Classification Search
CPC .......... G06Q 10/06; G06F 8/34; G06N 5/003; Y10S 707/99942
USPC .................... 707/609, 999.001, 737
See application file for complete search history.

(56) References Cited

U.S. PATENT DOCUMENTS

| | | | |
|---|---|---|---|
| 6,745,382 B1 * | 6/2004 | Zothner | 717/107 |
| 2003/0195789 A1 * | 10/2003 | Yen | 705/9 |
| 2005/0021383 A1 * | 1/2005 | Fliess et al. | 705/8 |
| 2009/0248430 A1 * | 10/2009 | Hubert et al. | 705/1 |

* cited by examiner

*Primary Examiner* — Yuk Ting Choi
(74) *Attorney, Agent, or Firm* — Buckley, Maschoff & Talwalkar LLC (57) ABSTRACT

A method may include receiving unstructured content data related to a business entity by a networked service application; selecting, via a user interface of the networked service application and based at least in part on the received unstructured content data, a business template, the business template being a representation of a networked business object data structure having associations with structured data; and creating, by the networked service application, an instance of the networked business object by associating at least some of the received content data with the business template and the networked business object associated with the business template.

18 Claims, 8 Drawing Sheets

700

RECEIVE UNSTRUCTURED CONTENT DATA RELATED TO A BUSINESS ENTITY BY A NETWORKED SERVICE APPLICATION
705

SELECT, BASED AT LEAST IN PART ON THE RECEIVED UNSTRUCTURED CONTENT DATA, A BUSINESS TEMPLATE THAT IS A REPRESENTATION OF A NETWORKED BUSINESS OBJECT DATA STRUCTURE HAVING ASSOCIATIONS WITH STRUCTURED DATA
710

CREATE, BY THE NETWORKED SERVICE APPLICATION, AN INSTANCE OF THE NETWORKED BUSINESS OBJECT BY ASSOCIATING AT LEAST SOME OF THE RECEIVED CONTENT DATA WITH THE BUSINESS TEMPLATE
715

RECEIVE UNSTRUCTURED CONTENT DATA RELATED TO A BUSINESS ENTITY BY A NETWORKED SERVICE APPLICATION
705

SELECT, BASED AT LEAST IN PART ON THE RECEIVED UNSTRUCTURED CONTENT DATA, A BUSINESS TEMPLATE THAT IS A REPRESENTATION OF A NETWORKED BUSINESS OBJECT DATA STRUCTURE HAVING ASSOCIATIONS WITH STRUCTURED DATA
710

CREATE, BY THE NETWORKED SERVICE APPLICATION, AN INSTANCE OF THE NETWORKED BUSINESS OBJECT BY ASSOCIATING AT LEAST SOME OF THE RECEIVED CONTENT DATA WITH THE BUSINESS TEMPLATE
715

NETWORKED PROCUREMENT

FIELD

Some embodiments generally relate to business objects supported by a business process platform. More specifically, some embodiments relate to the inclusion of unstructured data and structured data of a networked business process, including the example of a procurement process though not limited to such, and its related networked business objects that may be shared by a plurality of networked entities.

BACKGROUND

A business object is a software model representing real-world items used during the transaction of business. For example, a business object may represent a business document such as a sales order, a purchase order, or an invoice. A business object may specify business logic and/or data having any suitable structure. The structure of a business object may be determined based on the requirements of a business scenario in which the business object is to be deployed. A business solution for a particular business scenario may include many business objects, where the structure of each business object has been determined based on the requirements of the particular business scenario.

Conventional business practices and processes typically depend on an on-going exchange of business documents including structured data to implement the business processes. In typical fashion, each step of the business process is negotiated and agreed upon by the business partners and further memorialized in a document or record of structured data. The reliance on the creation and exchange of different documents, including documents of different versions, increases the costs of doing business and in some instances is not very efficient.

People or social networks are an increasingly popular mechanism for people to contact and interact with each other. Social networks may support the exchange of user generated media of various types as the communication means between different business contact or connections. Social networks may support the initialization or introduction of different people. While a social network may support the exchange of unstructured data between people, social network artifacts are not typically efficiently incorporated into the structured data realm of business processes and business documents.

Accordingly, a method and mechanism for effectively incorporating unstructured data with a business process are desired, and may be provided by some embodiments herein.

DETAILED DESCRIPTION

As an introduction to embodiments of the present disclosure, a conventional procurement process will be introduced to highlight an example of some of the problems and a use case providing motivation for the embodiments herein. Those skilled and knowledgeable in the arts related to business processes will understand that some characteristics of the procurement process example may also exist in a great many of other business processes. Accordingly, embodiments herein are not limited to a procurement process or environment.

Figure 1:
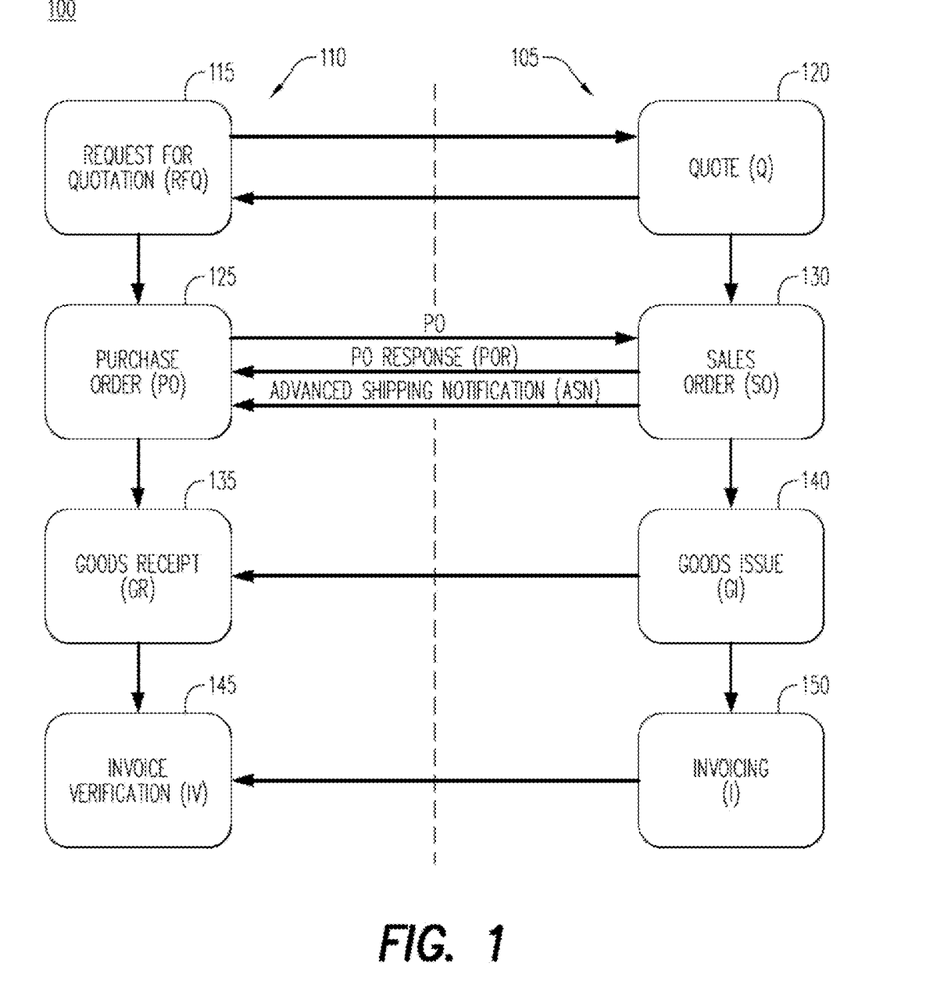
FIG. 1 is an illustrative depiction of a procurement process.

FIG. 1 is an illustrative depiction of a process 100 involving an interaction and exchange of data between entities. Process 100 represents a conventional procurement process, including the exchange of multiple documents between, for example, a vendor 105 on a supplier side and a customer 110 on a buyer side. Process 100 may encompass a number of stages as process 100 proceeds from a request for quotation (RFQ) stage to an invoicing (I) stage. In a typical sequence of events, customer 110 may issue a RFQ 115 document to vendor 105 regarding a product or service. In reply, vendor 105 may provide a quote (Q) document 120 that includes, for example, a price and schedule for the vendor to deliver the subject product or service. In a next stage of process 100, customer 110 generates a purchase order (PO) 125 that is sent to vendor 105. Vendor 105 generates a sales order (SO) and may provide a purchase order response (POR) and an advanced shipping notification (ASN) to the customer regarding the subject product or service. Continuing with process 100, vendor 105 may next provide the agreed upon product or service to customer 110, with the issuance of the goods reflected in a goods issue (GI) 140 document. Complimentary to GI 140, customer 110 may generate a goods receipt (GR) 135 document that reflects the customer's receipt of the goods from the vendor. Process 100 may then proceed to an invoicing stage where vendor 105 generates and issues an invoice (I) 150 to customer 110. Customer 110 may produce an invoice verification (IV) 145, which acknowledges and confirms the invoice from the vendor is accurate and acceptable. It should be appreciated that process 100 is an illustrative example of a procurement process, where additional, fewer, and alternative operations other than those specifically shown in FIG. 1 may be included in the process.

It is noted that PO 125 and SO 130 may, in large part, contain some of the same data since they relate to a same stage of the procurement process. However, PO 125 and SO 130 are separate and distinct documents generated and maintained by different entities, each having their own identifiers and configured according to requirements and preferences of their respective owners. In a similar manner, the other documents related to each of the stages of procurement process 100 may also contain, to an extent, some of the same data or content as other documents related to the procurement process. For example, RFQ 115 and Q 120 may include a number of terms and conditions that are the same. However, customer 110 may generate and maintain RFQ 115 in its computer systems whereas vendor 105 generates and maintains Q 120 in its own computing system. Accordingly, procurement process 100 may involve the exchange of numerous documents and data records, with at least some of those documents and records including data contained in other documents and records also associated with the procurement process.

Vendor 105 and customer 110 may, in some instances, connect to each other via a communication network (not shown) to exchange the many different documents (e.g., 115-150). Even when and/or where vendor 105 and customer 115 connect with each in fulfillment of process 100, the numerous different documents each need to be separately agreed upon, generated, maintained, and then transmitted between the entities. Process 100 is an illustrative example involving only one vendor 105 and one customer 110. The complexity and resources required to implement process 100 may increase as the number and/or scope of the involved entities increases.

A business object (BO) is an abstract type or class data structure having fields with attributes, where metadata describes the attribute fields. The documents of process 100 may be represented as an instantiation of a BO type or class. A BO may specify business logic and/or data and/or methods having any suitable structure. The structure of a BO may be determined based on the requirements of a business scenario in which the BO is to be deployed. A business solution for a particular business scenario may include many business objects (BOs), where the structure of each BO has been defined based on the requirements of the particular business scenario. The BO may represent real-world items (e.g., data files, records, documents, etc.) of a business transaction or process (e.g. procurement process 100) such as, for example, PO 125, SO 130, and 150, as well as the other documents and data actions shown in FIG. 1. It is noted that other types of business items may be represented by a BO, including those not specifically shown in FIG. 1.

Figure 2:
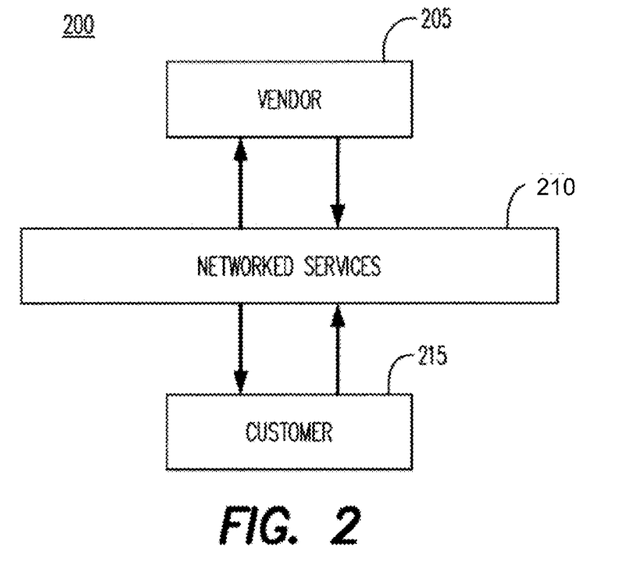
FIG. 2 is a block diagram of a system according to some embodiments.

FIG. 2 is a block diagram of a system 200 according to some embodiments herein. System 200 may include a first entity 205 and a second entity 215 that are networked and connected to each other via networked services 210. Entities 205 and 210 may be business partners engaged in a business transaction or relationship. System 200 may be implemented and/or facilitated by an ever-increasing connectivity of business partners in a real-world business environment. Continuing the procurement process example of FIG. 1, the first entity of FIG. 2 is a vendor 205 and the second entity is a customer 215. While the connectivity depicted in FIG. 2 may offer some increased enhancement(s) for a process such as, for example, process 100, networked services 210 may include a procurement service that leverages the networked connectivity of vendor 205 and customer 215 in some embodiments herein. Networked services 210 may be provided, facilitated, or supported by a cloud service, software as a service (SaaS), and other implementations. In some embodiments, a communication network of system 200 may include an on-demand private cloud, whereas some instances of the network may include a public network. In some embodiments, some networks may include email, social networks, chat forums, the Internet, etc.

Figure 3:
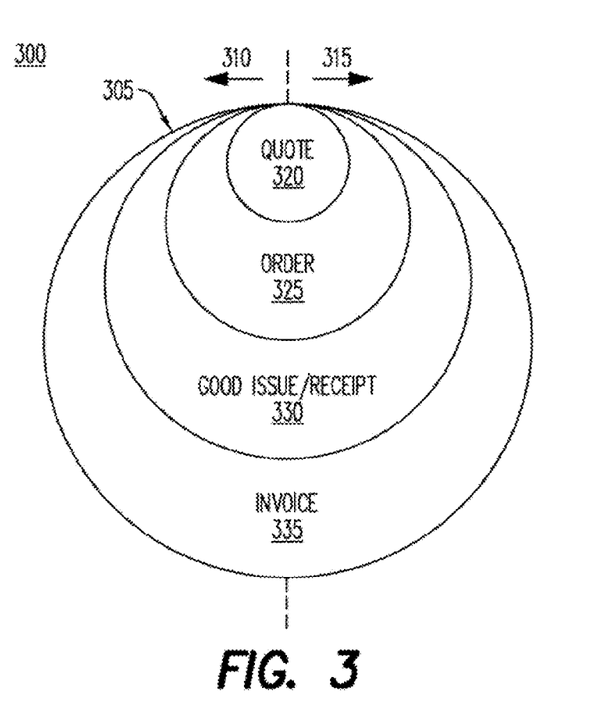
FIG. 3 is an illustrative depiction of a networked business object according to some embodiments.

FIG. 3 is a logical depiction of a new meta model 300 that may facilitate business processes in a networked environment. In some embodiments, meta model 300 may be referred to as a networked business object (n-BO). Meta model 300 may include a particular n-BO 305. In some aspects, n-BO 305 reflects a business process. In particular, n-BO 305 may reflect a procurement process including multiple aspects of a procurement process from a quote state 320 to an invoice state 335, where the procurement process relates to a vendor 315 and a customer 310. Accordingly, a single n-BO may reflect a process comprising multiple states, steps (e.g., sub-processes) or stages that may be shared between different networked entities (e.g., vendor 315 and customer 310).

In some aspects, the single n-BO 305 data structure may be defined to "evolve" from a quote to an invoice, including the intervening stages of the procurement process. In some embodiments, an n-BO comprises a plurality of states, where each state reflects and represents a distinct stage or level of the business process reflected by the n-BO. For example, n-BO 305 includes a Quote state 320. Quote state 320 may include attributes typically associated with a RFQ and a Quote. In some embodiments, n-BO 305 may include some attributes found in a conventional PO and SO of FIG. 1, but since as only one data structure is shared in a networked connectivity context in some embodiments, the attributes of n-BO 305 may not necessarily correspond to the conventional PO and SO since redundancies may be reduced and separate documents and data records need not be generated and maintained. For example, n-BO 305 may be identified by a single reference identifier name and/or number, thereby eliminating a need for separate PO and SO identifiers. In some aspects, all stages of the procurement process may be referenced by n-BO 305 using the same common identifier for the n-BO. N-BO 305 may also include an Order state 325, a Goods Issue/Receipt state 330, and an Invoice state 335.

In some embodiments, n-BO 305 may provide a mechanism (i.e., a data structure) that facilitates collaborative processes wherein multiple entities may share and work on the same data structure, n-BO 305. The networked entities may have shared access to the common data structure, the n-BO, and the data referenced thereby. In this manner, the multiple entities having networked access to the n-BO need not exchange documents. Instead, the single network accessible n-BO reflecting a business process may be maintained in the cloud and accessed on-demand by the entities interacting with each other and the n-BO. Furthermore, an n-BO need not be separately replicated and/or persisted for each or even two or more of the networked entities separate since the entities are networked to each other and have networked access to the n-BO.

Figure 4A:
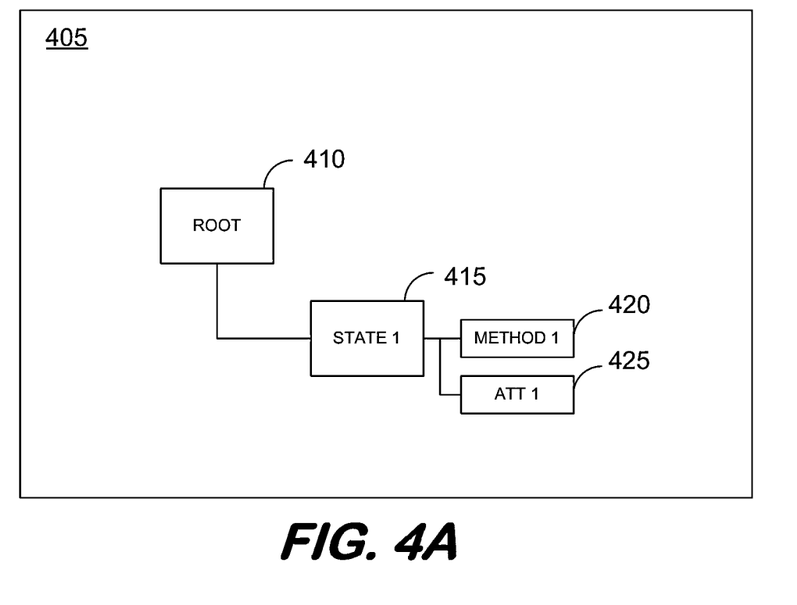
FIG. 4A is a simplified diagram of a networked business object according to some embodiments.

FIG. 4A is an illustrative depiction of an n-BO 405, in accordance with some embodiments herein. In this example, n-BO 405 includes two nodes, a root node 410 and node 415, state 1. Each of the nodes of the n-BO may have a number of attributes (not shown) defining the data requirements of the n-BO. For example, attributes for Quote state 320 may include a "name" field for a vendor, an "address" field for the vendor's address, and a "price" field. Other attribute fields may also be associated with Quote state 320. In some embodiments, one or more methods or actions may be associated with n-BOs herein. In the example of FIG. 4A, a method 1 (420) is defined and associated with the particular n-BO 405, state 1 (415) depicted therein. Additionally, an attribute "ATT 1" (425) is also defined and associated with n-BO 405. The description of the attributes and the methods associated with an n-BO may be embodied as metadata. Thus, for the metadata describing the data structure of FIG. 4A, a method 1 (420) and an attribute "ATT 1" (425) are defined and associated with the particular n-BO state depicted therein.

In some embodiments, metadata associated with n-BO 405 may include information defining the structure, attributes, and methods of the n-BO object model. Accordingly, the metadata may include the definitions for the attributes and methods associated with each state of the n-BO, as well as the relationships between the nodes of the n-BO and relationships (e.g., dependencies, uses, etc.) of the n-BO with other data structures (e.g., other n-BOs and other data structures). The metadata may be, for example, an extensible markup language. In this regard, n-BO 405 is an object model class or type. In some embodiments, n-BO instances herein may be generated in a run-time environment and persisted in a data repository or data store.

Figure 4B:
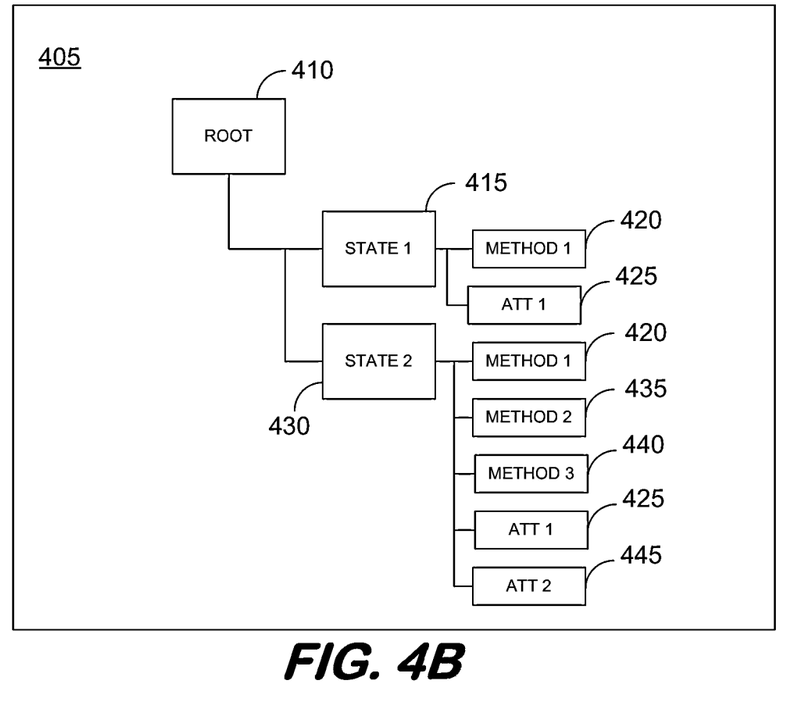
FIG. 4B is an illustrative depiction of the networked business object of FIG. 4A, including an additional state according to some embodiments.

FIG. 4B is another depiction of n-BO 405. The n-BO 405 of FIG. 4B comprises a different state than state of the n-BO 405 depicted in FIG. 4A. Although the same n-BO 405 is depicted in FIGS. 4A and 4B, the state of the n-BO in each of the figures is different and distinct from each other. Accordingly, the attributes and methods of the n-BO in FIGS. 4A and 4B are different, as reflected in the difference in nodes shown in FIGS. 4A and 4B. FIG. 4B may reflect Order state 325 introduced in FIG. 3. Order state 325 includes more attributes than the logically lower Quote state 320. The increased number and/or type of attributes and methods of Order state 325 may be based, at least in part, on an order related to the procurement process reflected by n-BO 300 and 405 including more detailed data and actions than a quote.

In some aspects, Order state 325 may logically be viewed as a higher level state than Quote state 320. In some embodiments, a logically higher level state includes all of the attributes and methods of a logically lower level state. As shown, n-BO 405 of the state shown in FIG. 4B includes 3 nodes (i.e., root node 410; state 1 node 415, state 2 node 430). Additionally, n-BO 405 of the state depicted in FIG. 4B includes a number of methods, namely method 1 (420), method 2 (435), and method 3 (440). The methods may be operations defined for and available for execution by the n-BO 405. Like attributes, metadata may be used to define and describe the methods of the n-BO. Additionally, attributes "ATT 1" (425) and "ATT 2" (445) are also defined and associated with the n-BO 405 depicted in FIG. 4B.

Figure 5:
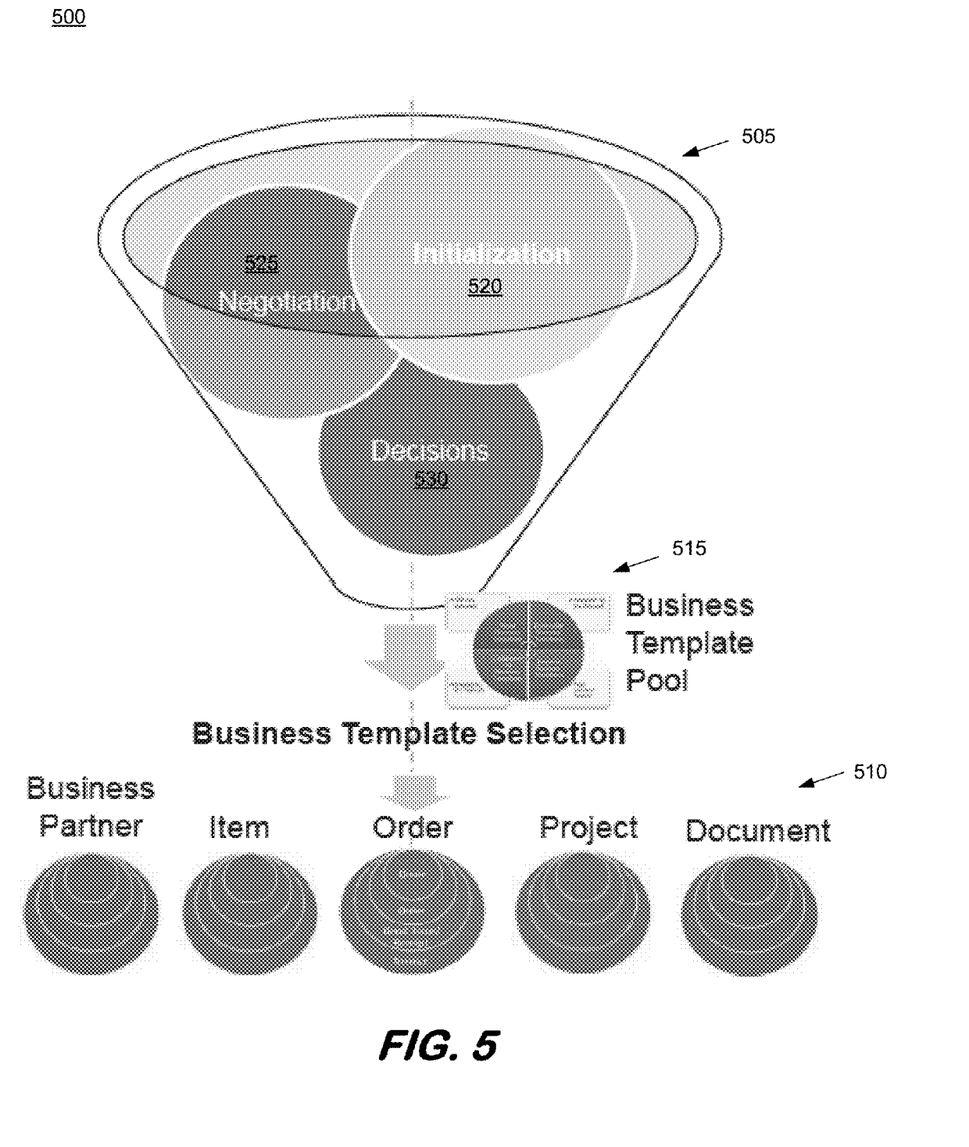
FIG. 5 is an illustrative depiction of a process flow according to some embodiments.

FIG. 5 illustrates a logical representation of a process 500. In some embodiments, process 500 may include a depiction of a networked procurement procedure in accordance with aspects herein. Other contexts and use-cases other than a networked procurement process may be reflected by at least some aspects of FIG. 5. FIG. 5 includes a process or mechanism for associating and/or linking unstructured data and structured data. FIG. 5 may receive unstructured data at 505 and may provide a data structure including both unstructured and structured data at 510. The unstructured data herein may refer to text based messages or records, audio records, images (e.g., still photographs and motion videos), instant messages, and other user-generated media, such a social or people network entries, online messages and chats.

Unstructured data exchanged between business entities and individuals may not previously have been captured or otherwise represented in a traditional BO representing a business process since a BO may typically operate with structured and semi-structured data. However, people often communicate by exchanging unstructured data, where the modes of communication may include phone calls, emails, instant messages, exchanges of information on social communication networks, face-to-face meetings, etc. In some aspects, FIG. 5 provides a mechanism to include or incorporate unstructured data with an n-BO such that an n-BO representing a process may include the unstructured data and structured data relating business partners/entities to a business process.

In some aspects, an initial or first contact between business entities may occur in a manner or communication mode where unstructured data is exchanged between the business entities. In some embodiments, the exchange of unstructured data may occur after the business entities have been previously initialized contact with each other. Whether exchanged at an initial contact between the business entities or at some time thereafter, the unstructured data may be received from, for example, a social network environment. While not structured, information included in or conveyed by the unstructured data may be desired by a business entity or business process (as reflected in an n-BO) for use in or by one or more business processes and documents represented by an n-BO.

In some embodiments, exchanges of data may generally include an initialization component 520, a negotiation component 525, and a decision making component 530. The initialization component 520 may encompass unstructured data including introductions between two business entities. In some aspects, initialization component 520 may include email introductions, social networking connections or mentions, in-person discussions, online chat sessions, etc. Initialization component 520 may include unstructured data received in response to a request for information from a business entity. For example, a business entity may solicit interest from other business entities regarding providing a service or product (e.g., Are you able to supply computers to my business?) via a social network, a blog, an on-line chat service, phone calls, conference meetings, etc.

The scope of a relationship initiated by initialization component 520 may further be shaped by negotiation component 525. In some aspects, a business entity may work to determine what, if any, type of business relationship can or should be developed with a business contact initiated by initialization component 520. For example, in a procurement use case herein, a business entity (e.g., a manager, device, or system) may work to determine what type of business relationship, if any, is possible with the business contact(s) obtained by initialization component 520. The business manager may further exchange information with a potential business partner to determine what, if any, products and services the business contact may deliver. During the exchange of information by negotiation component 525, the business manager and the business contact (i.e., a potential business partner) may "negotiate" one or more conditions for a business relationship between them. In some aspects, the business manager may solicit feedback from the business contact. For example, the business manager may ask, "what are you key success factors", "what are your hours of availability", "are you qualified to provide to work on my projects", etc. Continuing the procurement example, the business manager may ask the business contact for information in the form of a request for information (RFI) or a request for proposal (RFP). In reply to the request(s) for information, the business contact operates to provide the requested information to the business manager, where the information may be unstructured data in accordance with aspects herein.

Continuing to refer to FIG. 5, implicit or explicit decision making component 530 may relate to the business entity (e.g., manager, device, or system) making a determination as to whether to proceed with forming a business relationship with the business contact based on the information exchanged therewith, as well as the extent of the business relationship interactions. Based on the decision(s) of decision making component 530, a business relationship may be pursued that considers the information gathered during the initialization and negotiation phases of process 500. For example, a procurement process may be started between the business manager and the business contact based on the exchange of information between the business manager and the business contact. A business template may be selected and used to capture the desired and anticipated business interactions between the business manager and the business contact as indicated by, at least in part, the unstructured content data. For example, a contract negotiation may be started based on a determination to proceed with a business relationship. The business process of negotiating a contract may be supported by at least one business template in the business templates pool 515. A "contract negotiation" business template selected from business template pool 515 may be used to capture the business interactions between the business manager and the business contact.

In some aspects, the business template(s) selected for use from business templates pool 515 may be selected based on a collaboration between the business manager and the business contact. That is, the aspect of selecting a business template herein may be determined based input from all of the involved entities, instead of a unilateral decision.

In some embodiments, the business relationship between the business entities (e.g., a business manager and a business contact) may involve a number of interactions, such as a procurement process. Accordingly, the interactions may be efficiently represented by one or more n-BOs 510. The business templates in business templates pool 515 may form the visualized basis for n-BO data structures 510 that will be used to represent and hold data for the subject business process (e.g., procurement). The particular n-BOs depicted in FIG. 5 are meant to illustrate a range and variety of n-BO types in accordance with aspects herein and are not intended to be indicative of an exhaustive listing of possible n-BOs.

In accord with some aspects herein, an n-BO 510 may be (automatically) created in a background environment, unbeknownst to the related business entities. Whereas the business entities may actively interact with each other via a graphical user interface (UI) of a computing device connected to a networked service application, these same entities may not have a desire or need to be aware of the underlying data structure and/or the instantiations of an n-BO 510 corresponding to the business template selected from business templates pool 515.

In some aspects, instantiation n-BOs herein may occur during run-time (e.g., at an initialization or evolvement of an n-BO instance from one state to the next) of a service or program, with the additional methods and attributes of corresponding to the states of the n-BO being created (i.e., instantiated) during the run-time.

Some aspects of the object model class of embodiments herein have been described in the context of, primarily, a procurement process, but are not limited thereto. For example, some n-BO types may relate to and capture various aspects of a procurement process. It is noted that embodiments of the n-BOs object model herein may relate to or reflect different types of data and logic. For example, n-BO types may, in general and without limit, be defined and created for (1) a Business Partner, (2) an Order, (3) an Item (4) a Project, and (5) a Document. The Business Partner type n-BO may reflect data associated with a business contact, including the contact's position, skills, responsibilities, business functions, etc. Representing data associated with a business partner as an n-BO may be advantageous since a business partner's "footprint" in a business scenario may evolve over time as the business partner's activities and/or status and responsibilities evolve. The Order type of n-BO may include contractual based business relationships such as, for example, the procurement process reflected in n-BO 305. The Item type of n-BO may be related to and reflect a material, retail item, or service, where the item defined by the n-BO may change (i.e., evolve) over time. The Project type of n-BO may include one particular project or a program as an aggregation of similar projects, where a project may include timelines, activities, persons and other resources designated to accomplish the activities. This type of n-BO may also relate to an evolving process since the status of the project will change over time.

The Document type of n-BO may refer to any type of semi-structured data. Herein, semi-structured data may refer to a document or other record that includes data that is not strictly formatted to or represented by a table or other data model constraints but may include some tags or delimiters to separate elements of the data and add some structure to the data. While five general n-BO types are introduced herein, the present disclosure is not limited thereto.

In some embodiments, n-BOs herein are suitable for representing both structured and semi-structured data. In some aspects, both structured and semi-structured data may be effectively represented by n-BOs in some embodiments where collaborative access to the data is beneficial and the data reflected by the n-BOs may evolve from one state to another state.

Figure 6:
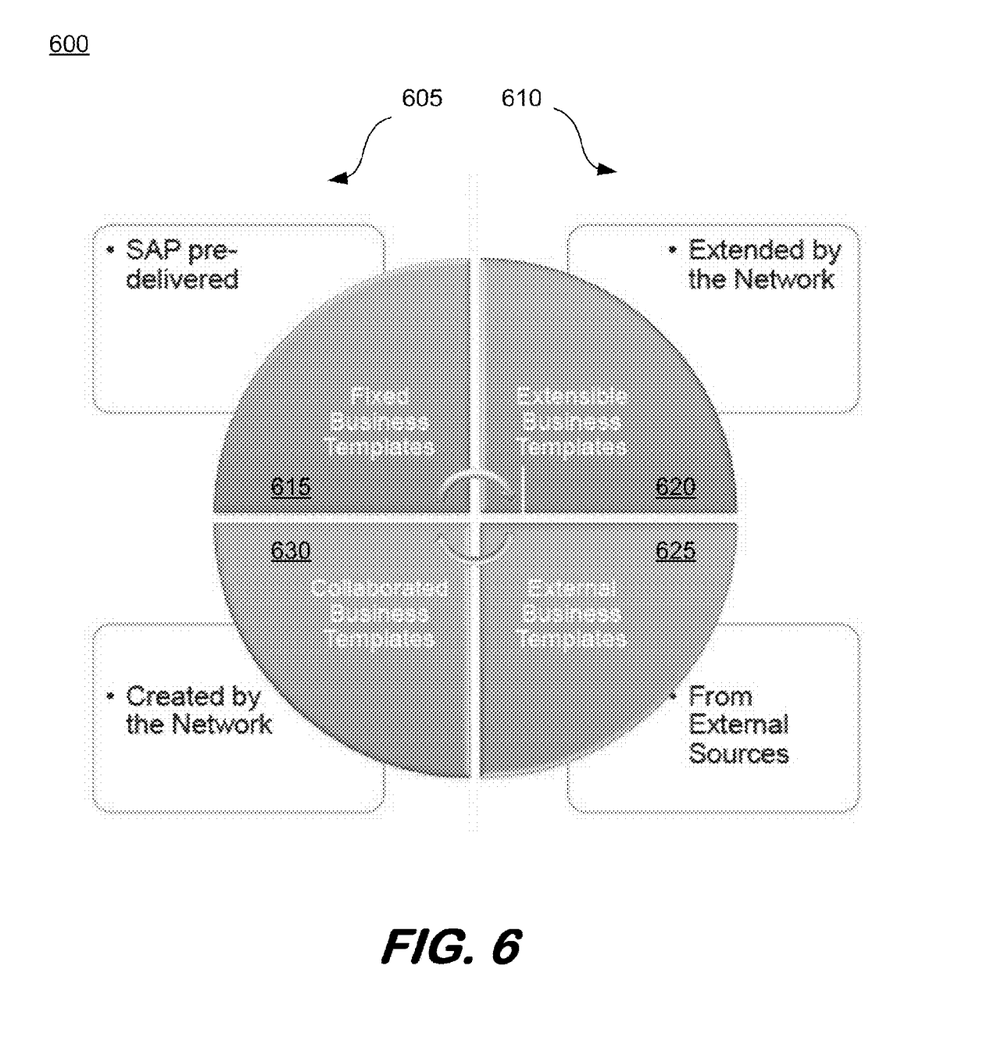
FIG. 6 is an illustrative rendering of a business templates pool.

FIG. 6 is an illustrative depiction of a business templates pool 600. Business templates pool 600 may include a plurality of business templates, including business templates accessed, created, provided, or potentially offered by either customer/buyer 605 or by vendor/supplier 610. In some embodiments, business entities have shared access to templates pre-defined and offered by a business application provider such as SAP AG, the assignee of the present patent application. The business templates provisioned through business templates pool 600 may include fixed business templates 615 deployed by the business application provider. Fixed business templates 615 may be created based on a business application provider's expertise and knowledge of business processes, including "best practices" for the businesses and industries for which the fixed business templates will be used. Fixed business templates 615 may be selected for use to capture the interactions and processes of, for example, buyer 605 and supplier 610, as indicated (at least in part) by the unstructured data exchanges therebetween. Additionally, fixed business templates 615 may be extended by a network of business partners that interact with each other. While the fixed business templates 615 may be created with wide applicability to a variety of businesses and/or industries, a particular entity may have specific operations that are not fully captured or anticipated by the fixed business templates 615. In some embodiments, the fixed business templates 615 may be used as copy formats to be modified to better suit the business partner's needs. As discussed above with regard to FIG. 5, some business templates herein may be created based on an interactive negotiation between business entities. As such, both a buyer 605 and a supplier 610, for example, may have some control over the characteristics of the business templates that are used herein to capture and relate unstructured data to the structured data and methods of business processes that are represented by n-BOs.

Business templates pool 600 may further include external business templates 625 that are created or provided by external sources. External business templates 625 may be created by a business partner or other business entity and a third party business application services provider. In some embodiments, it is envisioned that a business partner may have sufficient knowledge and insight to design external business templates. In some embodiments, the business application provider that designs and creates the fixed business templates 615 may provide tools and/or support to a business partner so that they may create the external business templates 625. External business templates 625 may be modified or edited by business entities (e.g., a business application provider or other business partner) to provide a set of collaborated business templates 630. In some aspects, a particular buyer or other entity may have specific operations that are not fully captured by the external business templates 625. In some embodiments, the external business templates 625 may be modified to better suit the entity's needs. Here too, both a buyer 605 and a supplier 610 (e.g., an entity) may exercise some control over the characteristics of the business templates that are used to capture and relate unstructured data to the structured data and methods of business processes and that are represented by n-BOs.

Figure 7:
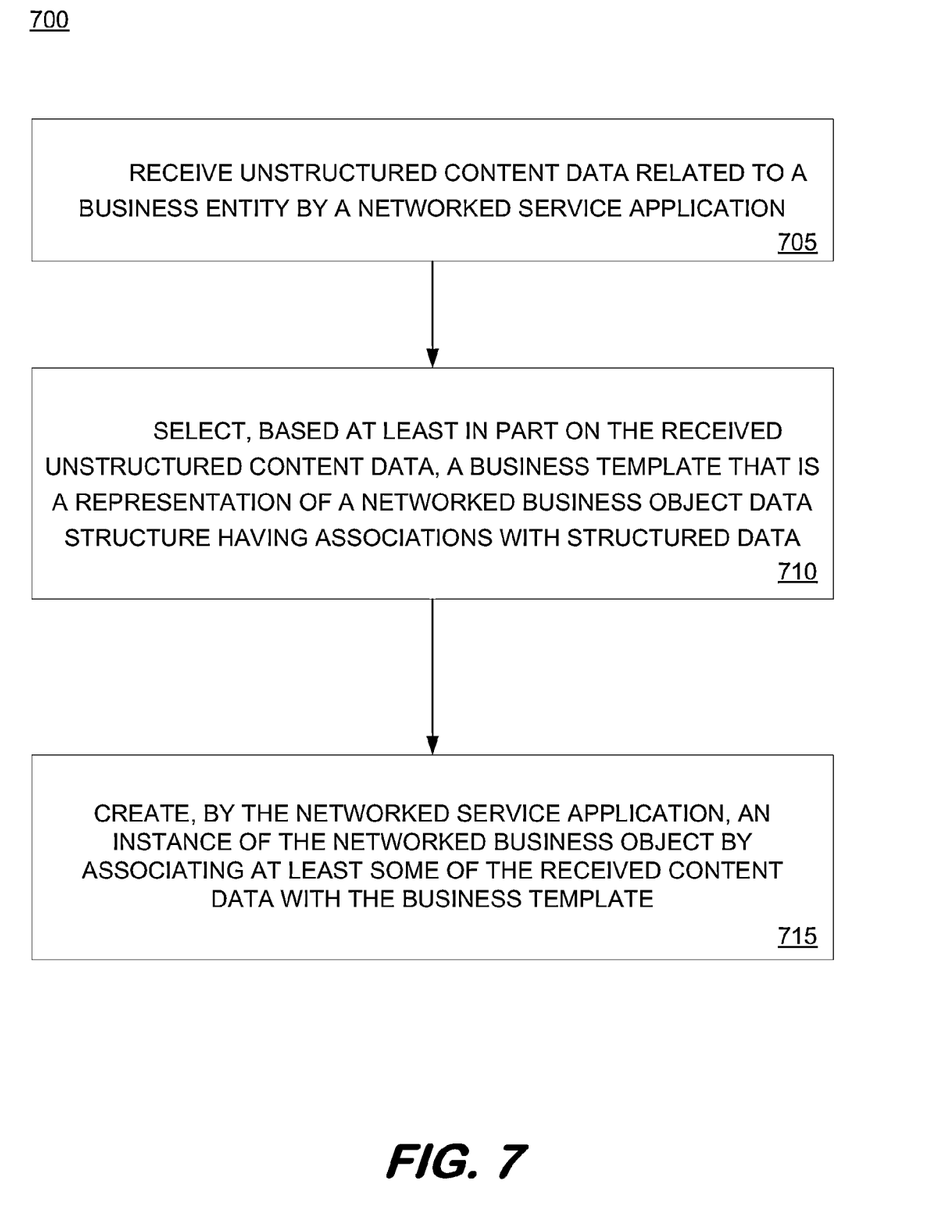
FIG. 7 is a flow diagram of a process according to some embodiments.

FIG. 7 is a flow diagram of a process 700 in accordance with some embodiments herein. In some aspects, process 700 may be related to a process of associating unstructured content data to a n-BO meta model data structure having associated structured and semi-structured data attributes and a plurality of states. At operation 705, unstructured content data related to a business entity is received by a networked service application. In some embodiments, the unstructured content data may be user generated data, including but not limited to voice messages, accounts of personal conversations, a video, an online chat entry, a social network entry or posting without limit to the format of the social network posting, a free-form text based message or listing, and other forms of communication. The unstructured content data may be received during a run time of a networked service application from a user/business entity interfacing with the networked service application via a user interface.

In some embodiments, operation 705 may be accomplished, in one or more steps. For example, the business entity or source of the unstructured content data may provide the unstructured content data over a period of time, in one or more communication sessions. In some aspects, the unstructured content data may be provided in response to a request for more or additional unstructured content data. The sources from which the unstructured content data is received may dictate the format of the unstructured content data. In some embodiments, the unstructured contend data may be (pre-) processed so as to render it in a format compatible with further processing herein.

Continuing to operation 710, a business template is selected based, at least in part, on the received unstructured content data. It is noted that the business template is a representation of an n-BO. The n-BO is typically a previously defined data structure having associations with structured data of a business entity or process. For example, the n-BO may be a previously defined ORDER n-BO as discussed hereinabove that has a number of structured data associations and the unstructured data content may include blog entries and social network entries. The selected business template may provide a mechanism to relate the received unstructured data of a business entity to the structured data and methods reflected in the n-BO.

Operation 710 may include, in some aspects, a determination operation that may include analyzing the received unstructured data content to determine what the unstructured data content conveys. For example, an analysis of the received unstructured content data may reveal that it relates to the availability of a related business partner, the business partner's area of expertise, and the business partner's geographic service area. Based on an analysis and determination of what the unstructured data is and/or conveys, an applicable and appropriate template may be selected from a business templates pool.

Operation 715 includes creating an instance (i.e., an instantiation) of an n-BO by associating at least some of the received content data with the selected business template. For example, the unstructured content data may include a social network entry including the name and an availability of a business partner. Such information may drive the selection of a "Supplier Profile" based on the nature of the received unstructured content data where the "Supplier Profile" may be represented by an n-BO such as an "BUSINESS PARTNER" n-BO.

Upon creation of a n-BO at 715 corresponding to a selected business template that facilitates or supports coupling unstructured data and structured data, the instance of the n-BO may be persisted in a data store and/or further processed by, for example, as part of an evolving business process.

Figure 8:
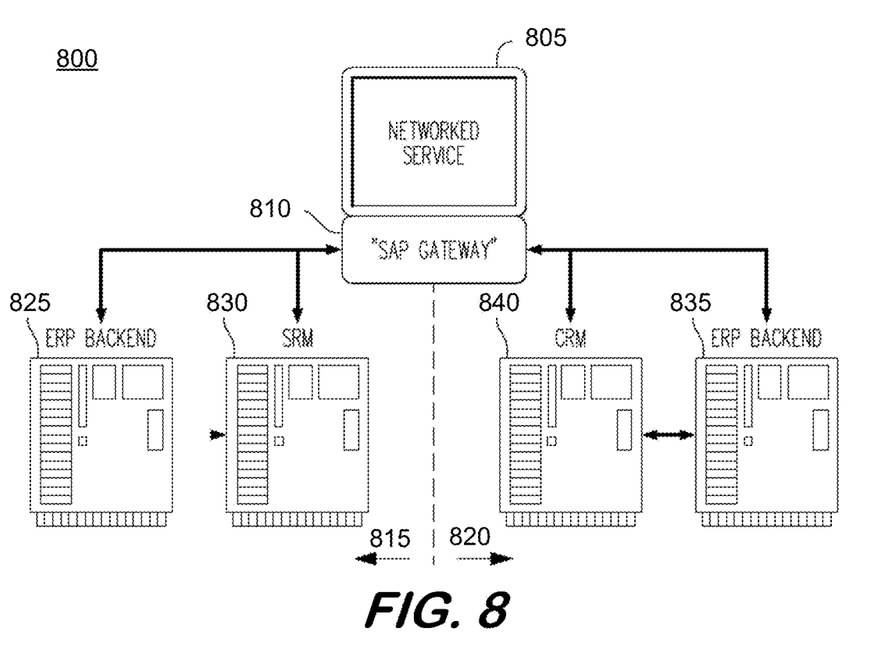
FIG. 8 is a diagram of a system according to some embodiments.

FIG. 8 is an illustrative diagram of a system 800, in accordance with some embodiments herein. In some embodiments, system 800 may facilitate and support the use and implementation of networked procurement that integrates unstructured data and n-BOs herein. System 800 includes a networked service 805 that connects to a number of other entities (e.g., customer 815 and vendor 820, and systems and devices related thereto) via a communications gateway 810. In some embodiments, networked service 805 and communication gateway 810 may be provided by the assignee of the present disclosure, SAP AG. Networked service 805 may be provided as an on-demand network accessed service, with n-BOs associated with the service provided and maintained as a SaaS through "cloud" computing. In this manner, the n-BOs of the networked service may be accessed and shared by various users connected to each other through the network of system 800.

In some embodiments, system 800 may be a system for facilitating and supporting the receipt and processing of unstructured data and n-BOs related to a networked procurement service. In the example of FIG. 8, networked service 805 may include n-BOs reflecting one or more n-BOs related to a procurement process, such as but not limited to the procurement processes specifically disclosed herein. In some aspects, data may exist in the "cloud", as defined by embodiments of the n-BO data structure disclosed herein and persisted as specific instantiations of the n-BOs. While the data may exist in the "cloud" as n-BOs, it may be integrated into backend systems and devices of customer 815 and vendor 820. In some embodiments, backend systems and devices of customer 815 and vendor 820 may include, for example, a customer or buyer ERP (Enterprise Resource Planning) backend system (e.g., a server) 825 and a vendor or supplier ERP backend system 835 for receiving buyer's and supplier's financial data, respectively. As illustrated in FIG. 8, additional systems and devices such as customer SRM (Supplier Relationship Management) system 830 and vendor CRM (Customer Relationship Management) system 840. In some aspects, the backend systems of FIG. 8 may include existing or legacy systems and devices, while in some instances the backend systems may include future developed and deployed systems and devices.

In some embodiments, unstructured data, n-BOs and the data associated therewith may be downloaded to the backend systems (e.g., 825 and 835) for integration with those systems. However, in accordance with some aspects of embodiments of the n-BOs disclosed herein, a single networked procurement n-BO associated with networked service 805 may reflect a plurality of states of the procurement process. Accordingly, the single n-BO comprising (1) evolutionary aspects by virtue of the different states belonging to the n-BO, and (2) joint collaborative aspects wherein data shared by networked entities (e.g., the customer and the vendor) are included in the same n-BO, may be sent to the backend systems (e.g., 825 and 835) for integration therewith. In this manner, there is no need to exchange multiple different documents and other types of data between the vendor and the customer.

Figure 9:
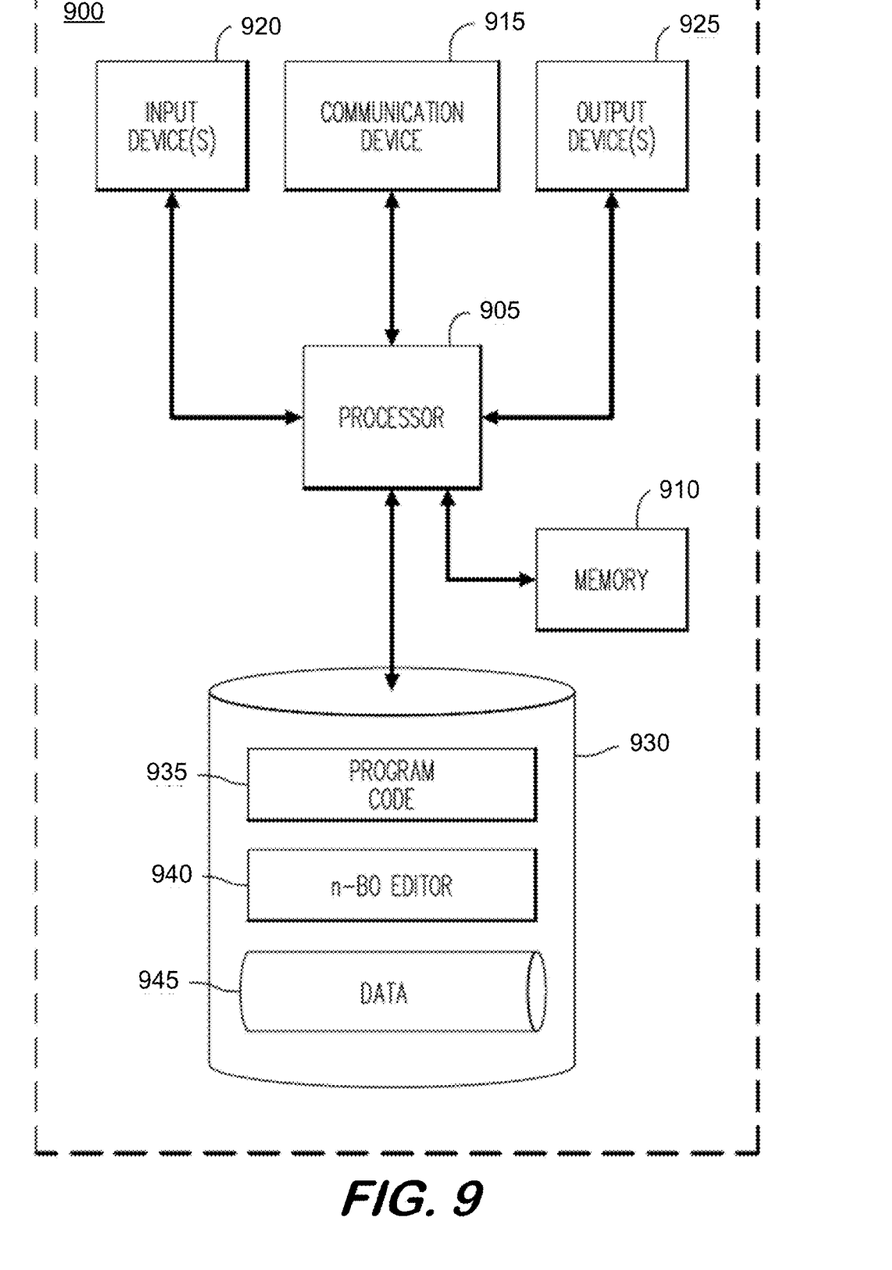
FIG. 9 is a block diagram of a device according to some embodiments.

FIG. 9 is a block diagram overview of a system or apparatus 900 according to some embodiments. System 900 may be, for example, associated with any of the devices described herein, including for example a server for supporting networked service 805. In some embodiments, system 900 may include a system for designing and defining n-BOs, as used by, for example, a software developer. System 900 comprises a processor 905, such as one or more commercially available Central Processing Units (CPUs) in the form of one-chip microprocessors or a multi-core processor, coupled to a communication device 915 configured to communicate via a communication network (not shown in FIG. 9 to another device or system. In the instance system 900 comprises an application server, communication device 915 may provide a means for system 900 to interface with a client device (e.g., an entity connected to a networked service in an on-demand environment). System 900 may also include a local memory 910, such as RAM memory modules. System 900 further includes an input device 920 (e.g., a touch screen, mouse and/or keyboard to enter content) and an output device 925 (e.g., a computer monitor to display a user interface element).

Processor 905 communicates with a storage device 930. Storage device 930 may comprise any appropriate information storage device, including combinations of magnetic storage devices (e.g., a hard disk drive), optical storage devices, and/or semiconductor memory devices. In some embodiments, storage device may comprise a database system.

Storage device 930 stores a program code 935 that may provide computer executable instructions for processing requests from, for example, client devices in accordance with processes herein. Processor 905 may perform the instructions of the program 935 to thereby operate in accordance with any of the process embodiments described herein. Program code 935 may be stored in a compressed, uncompiled and/or encrypted format. Program code 935 may furthermore include other program elements, such as an operating system, a database management system, and/or device drivers used by the processor 905 to interface with, for example, peripheral devices. In some embodiments, storage device 930 may include program instructions or code to facilitate and support an n-BO editor 940. The n-BO editor 940 may provide a mechanism for a developer to enter, manipulate, and otherwise edit metadata defining attributes and methods of an n-BO. Storage device 930 may also include data 945. Data 945 may be used by system 900, in some aspects, in performing the processes herein, such as process 800. In some embodiments, storage device 930 may comprise a database management system or aspects thereof. In some aspects, storage device 930 may store a n-BO object model, an instantiation of the n-BO (i.e., the data referenced by a particular instance of the n-BO), and other data types.

Each system and device described herein may be implemented by any number of devices in communication via any number of other public and/or private networks. Two or more of devices of may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a flash drive, a hard disk drive, a CD-ROM, a DVD-ROM, magnetic tape, and solid state RAM or ROM memories. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A computer-implemented method, the method comprising:
    receiving unstructured content data related to a business entity by a networked service application, the networked service application providing networked connectivity amongst a plurality of business entities, including the business entity related to the unstructured content data;
    selecting, via a user interface of the networked service application and based at least in part on the received unstructured content data, a business template, the business template being a representation of a networked business object that is an abstract type or class data structure having associations with at least one of structured data and semi-structured data, the networked business object having a plurality of states defined by metadata associated with the networked business object, the metadata defining attributes and methods associated with each of the plurality of states of the networked business object and defining relationships between nodes of the networked business object and relationships with other networked business objects;
    creating, by the networked service application, an instance of the networked business object by associating at least some of the received unstructured content data with the business template and the networked business object (n-BO) associated with the selected business template; and
    persisting, the created instance of the networked business object in a networked data store that provides shared access to the instance of the networked business object to the plurality of business entities, wherein data associated with the instance of the networked business object is neither exchanged between the plurality of business entities nor separately replicated for the business entities.

2. The method of claim 1, further comprising presenting the received unstructured content data to a user via the user interface of the networked service application.

3. The method of claim 1, wherein the unstructured content data includes at least one of an email message, an instant message, a video record, an audio record, a text based message, and user-generated media.

4. The method of claim 1, further comprising analyzing the received unstructured content data, wherein the selecting of the business template is based on the analyzing.

5. The method of claim 1, further comprising:
    requesting additional content data from the business entity;
    receiving additional content data from the business entity; and
    creating an instance of a networked object model based on the received additional content data.

6. The method of claim 1, wherein the plurality of states are defined by at least a first state associated with a first set of the attributes of the networked business object and a second state associated with a second set of the attributes of the networked business object.

7. The method of claim 6, wherein the instance of the networked business object is identified by a common identifier for all of the plurality of states of the networked business object.

8. The method of claim 1, wherein the business template is selected from a plurality of business templates.

9. The method of claim 6, wherein the networked business object logically represents one of: a business process with the plurality of states of the networked business object each reflecting a sub-process of the business process, and an entity with the plurality of states of the networked business object each reflecting a different stage of development of the entity.

10. A non-transitory computer readable medium having program instructions stored thereon, the medium comprising:
   instructions to receive unstructured content data related to a business entity by a networked service application, the networked service application providing networked connectivity amongst a plurality of business entities, including the business entity related to the unstructured content data;
   instructions to select, via a user interface of the networked service application and based at least in part on the received unstructured content data, a business template, the business template being a representation of a networked business object that is an abstract type or class data structure having associations with at least one of structured data and semi-structured data, the networked business object having a plurality of states defined by metadata associated with the networked business object, the metadata defining attributes and methods associated with each of the plurality of states of the networked business object and defining relationships between nodes of the networked business object and relationships with other networked business objects;
   instructions to create, by the networked service application, an instance of the networked business object by associating at least some of the received unstructured content data with the business template and the networked business object (n-BO) associated with the selected business template; and
   instructions to persist, the created instance of the networked business object in a networked data store that provides shared access to the instance of the networked business object to the plurality of business entities, wherein data associated with the instance of the networked business object is neither exchanged between the plurality of business entities nor separately replicated for the business entities.

11. The medium of claim 10, further comprising instructions to present the received unstructured content data to a user via the user interface of the networked service application.

12. The medium of claim 10, wherein the unstructured content data includes at least one of an email message, an instant message, a video record, an audio record, a text based message, and user-generated media.

13. The medium of claim 10, further comprising analyzing the received unstructured content data, wherein the selecting of the business template is based on the analyzing.

14. The medium of claim 10, further comprising:
   instructions to request additional content data from the business entity;
   instructions to receive additional content data from the business entity; and
   instructions to create an instance of a networked object model based on the received additional content data.

15. The medium of claim 10, wherein the plurality of states are defined by at least a first state associated with a first set of the attributes of the networked business object and a second state associated with a second set of the attributes of the networked business object.

16. The medium of claim 15, wherein the instance of the networked business object is identified by a common identifier for all of the plurality of states of the networked business object.

17. The medium of claim 10, wherein the business template is selected from a plurality of business templates.

18. The method of claim 15, wherein the networked business object logically represents one of: a business process with the plurality of states of the networked business object each reflecting a sub-process of the business process, and an entity with the plurality of states of the networked business object each reflecting a different stage of development of the entity.

* * * * *